United States Patent
Coggio et al.

(10) Patent No.: US 10,502,869 B2
(45) Date of Patent: Dec. 10, 2019

(54) OPTICAL ELEMENT WITH A POROUS LOW REFRACTIVE INDEX LAYER HAVING A PROTECTION LAYER

(75) Inventors: William D. Coggio, Westford, MA (US); Ramesh C. Kumar, Woodbury, MN (US); John A. Wheatley, Lake Elmo, MN (US); Michael L. Steiner, New Richmond, WI (US); William F. Edmonds, Minneapolis, MN (US); Lan H. Liu, Rosemount, MN (US); Encai Hao, Woodbury, MN (US); Robert F. Kamrath, Mahtomedi, MN (US); John J. Stradinger, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 13/879,842

(22) PCT Filed: Oct. 20, 2011

(86) PCT No.: PCT/US2011/057006
§ 371 (c)(1),
(2), (4) Date: Apr. 17, 2013

(87) PCT Pub. No.: WO2012/054680
PCT Pub. Date: Apr. 26, 2012

(65) Prior Publication Data
US 2013/0202867 A1 Aug. 8, 2013

Related U.S. Application Data

(60) Provisional application No. 61/405,015, filed on Oct. 20, 2010.

(51) Int. Cl.
*G02B 1/10* (2015.01)
*G02B 1/11* (2015.01)
(Continued)

(52) U.S. Cl.
CPC ............... *G02B 1/14* (2015.01); *G02B 1/105* (2013.01); *G02B 1/11* (2013.01);
(Continued)

(58) Field of Classification Search
CPC ..... Y10T 428/24975; Y10T 428/24355; Y10T 428/24364; Y10T 428/2438;
(Continued)

(56) References Cited

U.S. PATENT DOCUMENTS 5,032,460 A 7/1991 Kantner
5,154,962 A 10/1992 Mertens
(Continued)

FOREIGN PATENT DOCUMENTS

EP 193269 9/1986
EP 0 372 756 A2 6/1990
(Continued)

OTHER PUBLICATIONS

Nicholson, John W. "The Chemistry of Polymers, 4th edition." RSC Publising. 2012.*
(Continued)

*Primary Examiner* — Nancy R Johnson
(74) *Attorney, Agent, or Firm* — Robert V. Heiti; Lisa P. Fulton

(57) ABSTRACT

An optical article includes an optical element, a low refractive index layer disposed on the optical element having an effective refractive index of 1.3 or less and a polymeric protective layer disposed on the low refractive index layer. The low refractive index layer includes a binder, a plurality of metal oxide particles dispersed in the binder, and a plurality of interconnected voids. The polymeric protective layer does not increase an effective refractive index of the optical article by greater than 10%.

18 Claims, 1 Drawing Sheet

(51) Int. Cl.
*G02B 1/14* (2015.01)
*G02B 5/02* (2006.01)
*B32B 7/02* (2019.01)

(52) U.S. Cl.
CPC . *G02B 2207/107* (2013.01); *Y10T 428/24975* (2015.01); *Y10T 428/24997* (2015.04)

(58) Field of Classification Search
CPC ... Y10T 428/24421; G02B 1/105; G02B 1/11; G02B 1/111; G02B 1/115; G02B 1/14; G02B 1/18; G02B 2207/107
USPC .......................................... 428/141, 142, 143
See application file for complete search history.

(56) References Cited

U.S. PATENT DOCUMENTS

| | | | |
|---|---|---|---|
| 5,202,190 A | 4/1993 | Kantner | |
| 5,204,219 A | 4/1993 | Van Ooij | |
| 5,264,275 A | 11/1993 | Misuda | |
| 5,919,555 A | 6/1999 | Yasuda | |
| 5,945,209 A | 8/1999 | Okazaki | |
| 6,096,469 A | 8/2000 | Anderson | |
| 6,117,555 A * | 9/2000 | Fujimori | B08B 17/06 428/421 |
| 6,156,651 A | 12/2000 | Havemann | |
| 6,166,855 A | 12/2000 | Ikeyama | |
| 6,210,858 B1 | 4/2001 | Yasuda | |
| 6,596,375 B2 | 7/2003 | Murata | |
| 8,426,632 B2 | 4/2013 | Tanaka | |
| 8,534,849 B2 | 9/2013 | Coggio | |
| 2003/0228484 A1 | 12/2003 | Finley | |
| 2005/0109238 A1* | 5/2005 | Yamaki | B32B 7/02 106/287.16 |
| 2005/0249941 A1* | 11/2005 | Iijima | 428/328 |
| 2006/0093786 A1 | 5/2006 | Ohashi | |
| 2006/0204655 A1* | 9/2006 | Takahashi | 427/180 |
| 2007/0231510 A1 | 10/2007 | Baker | |
| 2008/0032064 A1 | 2/2008 | Gordon | |
| 2008/0292866 A1* | 11/2008 | Shinohara et al. | 428/318.4 |
| 2009/0263653 A1* | 10/2009 | Yamamoto et al. | 428/340 |
| 2009/0317634 A1* | 12/2009 | Suh | C08L 65/00 428/354 |
| 2010/0195311 A1* | 8/2010 | Furui et al. | 362/97.1 |
| 2010/0208349 A1 | 8/2010 | Beer | |
| 2011/0111203 A1 | 5/2011 | Roemer-Scheuermann | |
| 2012/0038990 A1 | 2/2012 | Hao | |
| 2013/0215512 A1 | 8/2013 | Weber | |
| 2013/0222911 A1 | 8/2013 | Coggio | |

FOREIGN PATENT DOCUMENTS

| | | |
|---|---|---|
| EP | 0 372 756 A3 | 6/1990 |
| EP | 1445095 | 8/2004 |
| JP | H11-281802 | 10/1999 |
| JP | 2001-100003 | 4/2001 |
| JP | 2005-352121 | 12/2005 |
| JP | 2006-171596 | 6/2006 |
| JP | 2006-297680 | 11/2006 |
| JP | 2008-003243 | 1/2008 |
| WO | WO 2008020610 A1 * | 2/2008 |
| WO | WO 2009-062140 | 5/2009 |

OTHER PUBLICATIONS

Paint Flow and Pigment Dispersion, Patton, T.C., $2^{nd}$ Edition, J. Wiley Interscience, 1978, Chapter 5, p. 126.
Modeling Cluster Voids and Pigment Distribution to Predict Properties and CPVC in Coatings. Part 1: Dry Coating Analysis and Sudduth, R. D. Pigment and Resin Technology, 2008, 37(6). p. 375.
Ridgeway, CJ, Transport in Porous Media, 2006, 63, p. 239.
Lee, H.K. et al, The Journal of Imaging Science and Technology, 2005, 49, p. 54.
R, Peng, Yoon et al, Adv. Materials 2008, vol. 20, p. 1934.
Hsu, K Y, Leu J. in 2008 Proceedings on Electronic Packaging Technology and High Density Packaging (ICEPT-HDP 2008, #4607043).

* cited by examiner

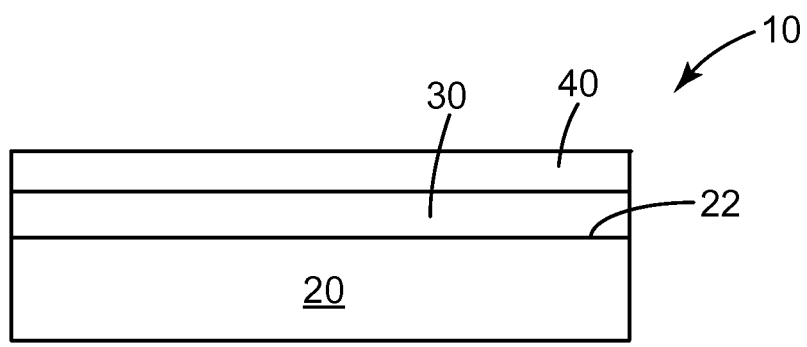

OPTICAL ELEMENT WITH A POROUS LOW REFRACTIVE INDEX LAYER HAVING A PROTECTION LAYER

BACKGROUND

Articles having a structure of nanometer sized pores or voids can be useful for several applications based on optical, physical, or mechanical properties provided by their nanovoided composition. For example, a nanovoided article includes a polymeric solid network or matrix that at least partially surrounds pores or voids. The pores or voids are often filled with gas such as air. The dimensions of the pores or voids in a nanovoided article can generally be described as having an average effective diameter that can range from about 1 nanometer to about 1000 nanometers. The International Union of Pure and Applied Chemistry (IUPAC) has defined three size categories of nanoporous materials: micropores with voids less than 2 nm, mesopores with voids between 2 nm and 50 nm, and macropores with voids greater than 50 nm. Each of the different size categories can provide unique properties to a nanovoided article.

Several techniques have been used to create porous or voided articles, including, for example polymerization-induced phase separation (PIPS), thermally-induced phase separation (TIPS), solvent-induced phase separation (SIPS), emulsion polymerization, and polymerization with foaming/blowing agents. Often, the porous or voided article produced by these methods requires a washing step to remove materials such as surfactants, oils, or chemical residues used to form the structure. The washing step can limit the size ranges and uniformity of the pores or voids produced. These techniques are also limited in the types of materials that can be used.

BRIEF SUMMARY

The present disclosure relates to optical elements that include a low refractive index layer and a polymeric protective layer. In particular, the present disclosure relates to optical elements that include a low refractive index layer and a polymeric protective layer that does not increase the effective refractive index of the optical element by more than 10%.

In one illustrative embodiment, an optical article includes an optical element, a low refractive index layer disposed on the optical element having an effective refractive index of 1.3 or less and a polymeric protective layer disposed on the low refractive index layer. The low refractive index layer includes a binder, a plurality of metal oxide particles dispersed in the binder, and a plurality of interconnected voids. The polymeric protective layer does not increase an effective refractive index of the optical article by greater than 10%.

In another illustrative embodiment, an optical article includes an optical element, a low refractive index layer disposed on the optical element having an effective refractive index of 1.3 or less, and a polymeric protective layer disposed on the low refractive index layer. The low refractive index layer includes a binder, a plurality of metal oxide particles dispersed in the binder, and a plurality of interconnected voids. The polymeric protective layer is formed from polymers having an average molecular weight of at least 50,000 g/mol.

In a further illustrative embodiment, an optical article includes an optical element, a low refractive index layer disposed on the optical element having an effective refractive index of 1.3 or less, and a cross-linked polymeric protective layer. The low refractive index layer includes a binder, a plurality of metal oxide particles dispersed in the binder, and a plurality of interconnected voids.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawing, in which:

FIG. 1 is a schematic diagram side elevation view of an illustrative optical article.

The FIGURE is not necessarily to scale. Like numbers used in the FIGURES refer to like components.

DETAILED DESCRIPTION

In the following description, reference is made to the accompanying drawing that forms a part hereof and in which is shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if a cell depicted in the FIGURES is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on," "directly connected to," "directly coupled with," or "directly in contact with" another element, there are no intervening elements, components or layers for example.

The present disclosure relates to optical elements that include a low refractive index layer and a polymeric protective layer. In particular, the present disclosure relates to optical elements that include a low refractive index layer and a polymeric protective layer that does not increase the effective refractive index of the optical element by more than 10%. The polymeric protective layer is a stable protective layer that does not substantially degrade the physical properties of the optical element or the low refractive index layer upon aging. The polymeric protective layer does not substantially diffuse into the nanoporous low refractive index layer. The present disclosure describes integrated optics in film format that can be useful for display applications. The present disclosure describes protective layers that improve cohesive strength of a film construction having a low refractive index layer. While the present disclosure is not so limited, an appreciation of various aspects of the disclosure will be gained through a discussion of the examples provided below.

Some embodiments of the diffuser coatings, articles or constructions of the present disclosure include one or more low refractive index layers that include a plurality of voids dispersed in a binder. The voids have an index of refraction $n_v$ and a permittivity $\varepsilon_v$, where $n_v^2 = \varepsilon_v$, and the binder has an index of refraction $n_b$ and a permittivity $\varepsilon_b$, where $n_b^2 = \varepsilon_b$. In general, the interaction of a low refractive index layer with light, such as light that is incident on, or propagates in, the low refractive index layer, depends on a number of film or layer characteristics such as, for example, the film or layer thickness, the binder index, the void or pore index, the pore shape and size, the spatial distribution of the pores, and the wavelength of light. In some embodiments, light that is incident on or propagates within the low refractive index layer "sees" or "experiences" an effective permittivity $\varepsilon_{eff}$ and an effective index $n_{eff}$, where $n_{eff}$ can be expressed in terms of the void index $n_v$, the binder index $n_b$, and the void porosity or volume fraction "f." In such embodiments, the optical film or low refractive index layer is sufficiently thick and the voids are sufficiently small so that light cannot resolve the shape and features of a single or isolated void. In such embodiments, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. In some embodiments, some of the voids can be sufficiently small so that their primary optical effect is to reduce the effective index, while some other voids can reduce the effective index and scatter light, while still some other voids can be sufficiently large so that their primary optical effect is to scatter light.

In some embodiments, the light that is incident on a low refractive index layer is visible light, meaning that the wavelength of the light is in the visible range of the electromagnetic spectrum. In these embodiments, the visible light has a wavelength that is in a range of from about 380 nm to about 750 nm, or from about 400 nm to about 700 nm, or from about 420 nm to about 680 nm. In these embodiments, the low refractive index layer has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some embodiments, the low refractive index layer is sufficiently thick so that the low refractive index layer has an effective index that can be expressed in terms of the indices of refraction of the voids and the binder, and the void or pore volume fraction or porosity. In such embodiments, the thickness of the low refractive index layer is not less than about 1 micrometer, or not less than about 2 micrometers, or in a range from 1 to 20 micrometers.

When the voids in a disclosed low refractive index layer are sufficiently small and the low refractive index layer is sufficiently thick, the low refractive index layer has an effective permittivity $\varepsilon_{eff}$ that can be expressed as:

$$\varepsilon_{eff} = f\varepsilon_v + (1-f)\varepsilon_b \qquad (1)$$

In these embodiments, the effective index $n_{eff}$ of the optical film or low refractive index layer can be expressed as:

$$n_{eff}^2 = f n_v^2 + (1-f)n_b^2 \qquad (2)$$

In some embodiments, such as when the difference between the indices of refraction of the pores and the binder is sufficiently small, the effective index of the low refractive index layer can be approximated by the following expression:

$$n_{eff} = f n_v + (1-f)n_b \qquad (3)$$

In these embodiments, the effective index of the low refractive index layer is the volume weighted average of the indices of refraction of the voids and the binder. Under ambient conditions, the voids contain air, and thus the refractive index $n_v$ for the voids is approximately 1.00. For example, a low refractive index layer that has a void volume fraction of about 50% and a binder that has an index of refraction of about 1.5 has an effective index of about 1.25.

In some embodiments, the effective index of refraction of the low refractive index layer is not greater than (or is less than) about 1.3, or less than about 1.25, or less than about 1.2, or less than about 1.15, or less than about 1.1. In some embodiments, the refractive index is between about 1.14 and about 1.30. In some embodiments, the low refractive index layer includes a binder, a plurality of particles, and a plurality of interconnected voids or a network of interconnected voids. In other embodiments, the low refractive index layer includes a binder and a plurality of interconnected voids or a network of interconnected voids.

A plurality of interconnected voids or a network of interconnected voids can occur in a number of methods. In one process, the inherent porosity of highly structured, high surface area fumed metal oxides, such as fumed silica oxides, is exploited in a mixture of binder to form a composite structure that combines binder, particles, voids and optionally crosslinkers or other adjuvant materials. The desirable binder to particle ratio is dependent upon the type of process used to form the interconnected voided structure.

While a binder resin is not a prerequisite for the porous fumed silica structure to form, it is typically desirable to incorporate some type of polymeric resin or binder in with the metal oxide network to improve the processing, coating quality, adhesion and durability of the final construction. Examples of useful binder resins are those derived from thermosetting, thermoplastic and UV curable polymers. Examples include polyvinylalcohol, (PVA), polyvinylbutyral (PVB), polyvinyl pyrrolidone (PVP), polyethylene vinly acetate copolymers (EVA), cellulose acetate butyrate (CAB) polyurethanes (PURs), polymethylmethacrylate (PMMA), polyacrylates, epoxies, silicones and fluoropolymers. The binders could be soluble in an appropriate solvent such as water, ethyl acetate, acetone, 2-butone, and the like, or they could be used as dispersions or emulsions. Examples of some commercially available binders useful in the mixtures are those available from Kuraray-USA, Wacker Chemical, Dyneon LLC, and Rhom and Haas. Although the binder can be a polymeric system, it can also be added as a polymerizable monomeric system, such as a UV, or thermally curable or crosslinkable system. Examples of such systems would be UV polymerizable acrylates, methacrylates, multi-functional acrylates, urethane-acrylates, and mixtures thereof. Some typical examples would be 1,6 hexane diol diacrylate, trimethylol propane triacrylate, pentaerythritol triacryalate. Such systems are readily available from suppliers such as Neo Res (Newark, Del.), Arkema (Philadelphia, Pa.), or Sartomer (Exton, Pa.). Actinic radiation such as electron beam (E-beam), gamma and UV radiation are useful methods to initiate the polymerization of these systems, with many embodiments utilizing UV active systems. Other useful binder systems can also be cationically polymerized, such systems are available as vinyl ethers and epoxides.

The polymeric binders can also be formulated with cross linkers that can chemically bond with the polymeric binder to form a crosslinked network. Although the formation of crosslinks is not a prerequisite for the formation of the porous structure or the low refractive index optical properties, it is often desirable for other functional reasons such as to improve the cohesive strength of the coating, adhesion to the substrate or moisture, or thermal and solvent resistance. The specific type of crosslinker is dependent upon the binder used. Typical crosslinkers for polymeric binders such as PVA would be diisocyanates, titantates such as TYZOR-LA™ (available from DuPont, Wilmington, Del.), poly (epichlorhydrin)amide adducts such as PolyCup 172, (available from Hercules, Wilmington, Del.), multi-functional aziridines such as CX100 (available from Neo-Res, Newark, Del.) and boric acid, diepoxides, diacids and the like.

The polymeric binders may form a separate phase with the particle aggregates or may be inter-dispersed between the particle aggregates in a manner to "bind" the aggregates together into a structures that connect with the metal oxidize particles through direct covalent bond formation or molecular interactions such as ionic, dipole, van Der Waals forces, hydrogen bonding and physical entanglements with the metal oxides.

Exemplary particles include fumed metal oxides or pyrogenic metal oxides, such as, for example, a fumed silica or alumina. In some embodiments, particles that are highly branched or structured may be used. Such particles prevent efficient packing in the binder matrix and allow interstitial voids or pores to form. Exemplary materials include highly branched or structured particles include Cabo-Sil™ fumed silicas or silica dispersions, such as, for example, those sold under trade designations EH5, TS 520, or pre-dispersed fumed silica particles such as those available as Cabo-Sperse™ PG 001, PG 002, PG 022, 1020K, 4012K, 1015 (available form Cabot Corporation). Fumed alumina oxides are also useful structured particles to form a low refractive index system although silica may be preferred since it has an inherently lower skeletal refractive index than alumina. Examples of alumina oxide are available under the trade name Cabo-Sperse, such as, for example, those sold under the trade designation Cabo-Sperse™ PG003 or Cabot Spec-Al™. In some embodiments, aggregates of these exemplary fumed metal oxides include a plurality of primary particles in the range of about 8 nm to about 20 nm and form a highly branched structure with a wide distribution of sizes ranging from about 80 nm to greater than 300 nm. In some embodiments, these aggregates pack randomly in a unit volume of a coating to form a mesoporous structure with complex bi-continuous network of channels, tunnels, and pores which entrap air in the network and thus lower the density and refractive index of the coating. Other useful porous materials are derived from naturally occurring inorganic materials such as clays, barium sulfates, alumina, silicates and the like.

Fumed silica particles can also be treated with a surface treatment agent. Surface treatment of the metal oxide particles can provide, for example, improved dispersion in the polymeric binder, altered surface properties, enhanced particle-binder interactions, and/or reactivity. In some embodiments, the surface treatment stabilizes the particles so that the particles are well dispersed in the binder, resulting in a substantially more homogeneous composition. The incorporation of surface modified inorganic particles can be tailored, for example, to enhance covalent bonding of the particles to the binder, thereby providing a more durable and more homogeneous polymer/particle network.

The preferred type of treatment agent is determined, in part, by the chemical nature of the metal oxide surface. Silanes are preferred for silica and other for siliceous fillers. In the case of silanes, it may be preferred to react the silanes with the particle surface before incorporation into the binder. The required amount of surface modifier is dependent upon several factors such as, for example, particle size, particle type, modifier molecular weight, and/or modifier type. The silane modifier can have reactive groups that form covalent bonds between particles and the binder, such as, for example, carboxy, alcohol, isocynanate, acryloxy, epoxy, thiol or amines. Conversely, the silane modifier can have non-reactive groups, such as, for example, alkyl, alkloxy, phenyl, phenyloxy, polyethers, or mixtures thereof. Such non-reactive groups may modify the surface of the coatings to improve, for example, soil and dirt resistance or to improve static dissipation. Commercially available examples of a surface modified silica particle include, for example, Cabo-Sil™ TS 720 and TS 530. It may sometimes be desirable to incorporate a mixture of functional and non-function groups on the surface of the particles to obtain a combination of these desirable features.

Representative embodiments of surface treatment agents suitable for use in the compositions of the present disclosure include, for example, N-(3-triethoxysilylpropyl) methoxyethoxyethoxyethyl carbamate, N-(3-triethoxysilylpropyl) methoxyethoxyethoxyethyl carbamate, 3-(methacryloyloxy) propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl) methyldimethoxysilane, 3- (methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy) ethoxy]acetic acid (MEEAA), beta-carboxyethylacrylate (BCEA), 2-(2-methoxyethoxy)acetic acid, methoxyphenyl acetic acid, and mixtures thereof.

Particle volume concentration (PVC) and critical particle volume concentration (CPVC) can be used to characterize the porosity of the particle binder system used to make the coating. The terms PVC and CPVC are well defined terms in the paint and pigment literature and are further defined in frequently referenced articles and technical books, such as, for example *Paint Flow and Pigment Dispersion*, Patton, T. C., 2$^{nd}$ Edition, J. Wiley Intersceince, 1978, Chapter 5, p. 126 and *Modeling Cluster Voids and Pigment Distribution to Predict Properties and CPVC in Coatings. Part 1: Dry Coating Analysis* and Sudduth, R. D; *Pigment and Resin Technology*, 2008, 37(6). p. 375.

When the volume concentration of the particles is larger than CPVC, the coating is porous since there is not enough binder to fill all the gaps between the particles and the interstitial regions of the coating. The coating then becomes a mixture of binder, particles, and voids. The volume concentration at which this occurs is related to particle size and particle structure wetting and/or shape. Formulations with volume concentrations above CPVC have a volume deficiency of resin in the mixture that is replaced by air. The relationship between CPVC, PVC and porosity is:

$$\text{Porosity} = 1 - \frac{CPVC}{PVC}$$

As used in this discussion of CPVC, the term "pigment" is equivalent to particles and the term "resin" is equivalent to binder. In certain binder-particle systems, when the volume concentration of the particles exceeds a critical value known, as the CPVC, the mixture becomes porous. Thus the coating becomes essentially a mixture of binder, particles, and air, because there is insufficient binder to fill all the gaps between the particles and the interstitial regions of the coating. When this occurs, the volume concentration is related to at least one of the pigment particle size distribution, wetting, and the particle structure or shape. Materials that provide desired low refractive index properties have submicron pores derived from particle-binder mixtures that are highly structured and formulated above their CPVC. In some embodiments, optical articles have CPVC values that are not greater than (or are less than) about 60%, or less than about 50%, or less than about 40%.

As described above, particles that are highly branched or structured prevent efficient packing in the binder matrix and allow interstitial voids or pores to form. In contrast, material combinations which fall below the desired CPVC will not be sufficiently porous. The BET method (described herein) may be helpful in determining CPVC and thus porosity of low index materials because the BET method analyzes pores that are less than 200 nm in diameter, less than 100 nm in diameter, or even less than 10 nm in diameter. As used herein, the term "BET method" refers to the Braunauer, Emmett, and Teller surface area analysis (See S. Brunauer, P. H. Emmett and E. Teller, *J. Am. Chem. Soc.,* 1938, 60, 309). The BET method is a well-known, scientifically validated method used to determine pore size, surface area, and percent porosity of a solid substance. BET theory relates to the physical adsorption of gas molecules on a solid surface and serves as the basis for obtaining physical information about the surface area and porosity of a solid surface. BET data can assist in the characterization of materials that meet minimum requirements for forming a porous structure.

The volume concentration of the particles described by the PVC/CPVC relationship is also related to the weight concentration of the particles. It is therefore, possible to establish particle weight ranges that are above the CPVC. The use of weight ratio or weight percent is one way to formulate mixtures with the desirable CPVC values. For the optical constructions of the present disclosure, weight ratios of binder to particle from 1:1 to 1:8 are desirable. A weight ratio of 1:1 is the equivalent of about 50 wt % particle, where as 1:8 is equivalent to about 89 wt % particle. Exemplary binder to metal oxide particle ratios are less than 1:2 (less than 33% binder), less than 1:3, less than 1:4, less than 1:5, less than 1:6, less than 1:7, less than 1:8, less than 1:9, and less than 1:10 (about 8-10% binder). The upper limit of binder may be dictated by the desired refractive index. The lower limit of binder may be dictated by the desired physical properties, for example, processing or final durability characteristics. Thus the binder to particle ratio will vary depending on the desired end use and the desired optical article properties.

In general, the low refractive index layer can have any porosity, pore size distribution, or void volume fraction that may be desirable in an application. In some embodiments, the volume fraction of the plurality of the voids in the low refractive index layer is not less than about 20%, or not less than about 30%, or not less than about 40%, or not less than about 50%, or not less than about 60%, or not less than about 70%, or not less than about 80%.

In some embodiments, portions of the low refractive index layer can manifest some low index properties, even if the low refractive index layer has a high optical haze and/or diffuse reflectance. For example, in such embodiments, the portions of the low refractive index layer can support optical gain at angles that correspond to an index that is smaller than the index $n_b$ of the binder.

In some embodiments, some of the particles have reactive groups and others do not have reactive groups. For example in some embodiments, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some embodiments, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

In some embodiments, the low refractive index layers or material has a BET porosity that is greater than about 30% (which corresponds to a surface area of about 50 m$^2$/g as determined by the BET method), porosity greater than about 50% (which corresponds to a surface area of about 65-70 $m^2/g$ as determined by the BET method), greater than about 60% (which corresponds to a surface area of about 80-90 $m^2/g$ as determined by the BET method), and most preferably between about 65% and about 80% (which corresponds to a somewhat higher surface area of values greater than about 100 $m^2/g$ as determined by the BET method). In some embodiments, the volume fraction of the plurality of interconnected voids in the low refractive index layer is not less than (or is greater than) about 20%, or greater than about 30%, or greater than about 40%, or greater than about 50%, or greater than about 60%, or greater than about 70%, or greater than about 90%. Generally it can be shown higher surface areas indicated higher percent porosity and thus lower refractive index, however, the relationship between these parameters is complicated. The values shown here are only for purposes of guidance and not meant to exemplify a limiting correlation between these properties. The BET surface area and percent porosity values will be dictated by the need to balance the low refractive index and other critical performance properties such as cohesive strength of the coating.

The optical constructions of the present disclosure can have any desired optical haze. In some embodiments, low refractive index layer has an optical haze that is not less than (or is greater than) about 20%, or greater than about 30%, or greater than about 40%, or greater than about 50%, or greater than about 60%, or greater than about 70%, or greater than about 80%, or greater than about 90%, or greater than about 95%. In some embodiments, the low index refractive layer has a low optical haze. For example, in some embodiments, the optical haze of the low index refractive layer is less than about 20%, less than about 10%, less than about 5%, less than about 3%, less than about 2%, less than about 1.5%, or less than about 1%.

In some embodiments, portions of neighboring major surfaces of each two neighboring layers in optical construction are in physical contact with each other. For example, portions of neighboring major surfaces of respective neighboring layers in optical construction are in physical contact with each other. For example, at least 30%, or at least 40%, or at least 50%, or at least 60%, or at least 70%, or at least 80%, or at least 90%, or at least 95% of the two neighboring major surfaces are in physical contact with each other.

In some embodiments, portions of neighboring major surfaces (major surfaces that face each other or are adjacent to each other) of each two neighboring layers in optical construction are in physical contact with each other. For example, in some embodiments, there may be one or more additional layers, not expressly shown in the FIGURES, disposed between the low refractive index layer and optical elements. In such embodiments, substantial portions of neighboring major surfaces of each two neighboring layers in optical constructions are in physical contact with each other. In such embodiments, at least 30%, or at least 40%, or at least 50%, or at least 60%, or at least 70%, or at least 80%, or at least 90%, or at least 95% of the neighboring major surfaces of each two neighboring layers in the optical construction are in physical contact with each other.

There are numerous coating techniques known in the art useful to make the embodiments of this invention. The more common techniques are, but not limited to, well known roll-to-roll automated processes such as knife bar, slot die, slide, curtain, roll and Grauvre coating techniques. It is also possible to coat these solutions using non-continuous methods such as inkjet, screen, offset printing, dip and spray coating techniques. While the exact coating technique is not critical to obtain the low refractive index properties some techniques enable multiple layers to be coated onto the substrate simultaneously, which can improve the economics of the coating process. The desired final application will dictate which technique if preferred.

FIG. 1 is a schematic diagram side elevation view of an illustrative optical article 10. The optical article 10 includes an optical element 20 with a major surface 22, a low refractive index layer 30 disposed on the major surface 22 of the optical element 20 having an effective refractive index of 1.3 or less, and a polymeric protective layer 40 disposed on the low refractive index layer 30. The low refractive index layer 30 is described above and includes a binder, a plurality of metal oxide particles dispersed in the binder, and a plurality of interconnected voids. The polymeric protective layer 40 is disposed on the low refractive index layer 30. The polymeric protective layer 40 does not increase the effective refractive index of the optical article 10 by greater than 10%.

The polymeric protective layer 40 and the low refractive index layer 30 can have any useful thickness. In some embodiments the polymeric protective layer 40 has a thickness in a range from 1 to 20 micrometers or from 1 to 15 micrometers and the low refractive index layer 30 has a thickness in a range from 1 to 30 micrometers or from 1 to 20 micrometers. In many embodiments, if the low refractive index layer 30 is thicker than 10-12 micrometers than the protective layer thickness can be similar in thickness or greater.

The optical article 10 can have any useful haze value. In many embodiments the optical article 10 has a haze value of 20% or greater, 50% or greater, 70% or greater, 75% or greater, or 90% or greater. In some embodiments, a second low refractive index layer (not shown) is disposed on the optical element 20 or polymeric protective layer 40 or between the low refractive index layer 30 and the polymeric protective layer 40, as desired. The second low refractive index layer can have the effective refractive index of 1.3 or less, and can be similar to the low refractive index layer 30.

The optical element 20 can be any useful optical element. In many embodiments the optical element 20 is a polarizing film, a diffusing film, a reflecting film, a retarder, a light guide or a liquid crystal display panel. In some embodiments the optical element 20 is a visible light transparent substrate. In some embodiments, the optical element 20 can be an absorbing polarizer or a reflective polarizer. Reflective polarizers include fiber, multilayer, cholesteric, and wire grid reflective polarizers, for example. Multilayer reflective polarizers include Brightness Enhancement Film (BEF) and Dual Brightness Enhancement Film (DBEF) both commercially available from 3M Company, St. Paul, Minn. In some embodiments, the optical element 20 can be a light redirecting film and being diffractive and/or refractive. In some embodiments, the optical element 20 can be a graphic film, triacetate cellulose, or an optical adhesive.

In some embodiments, the polymeric protective layer 40 is formed from polymers having an average molecular weight of at least 50,000 g/mol. In some embodiments, the polymeric protective layer 40 is formed from polymers having an average molecular weight of at least 100,000 g/mol, or at least 250,000 g/mol, or at least 500,000 g/mol.

In some embodiments, the polymeric protective layer 40 is formed from cross-linked polymers. The polymeric protective layer can cross link by any number of chemical reactions, such as a catalyzed or uncatalyzed self-reactive functional groups such as epoxies, aziridines, isocyanates, N-methanol amine groups, azalactones or titanate esters.

The crosslinking can occur through ester, amide, condensation reactions, alcohol dehydration, Diels-Alder and acid-base reactions or be catalyzed by UV or thermal polymerization. The crosslinking reaction can occur solely within the protective layer or can also occur at the interface with the porous low refractive index layer. The latter is an example of an interfacial reaction which can increase the interfacial cohesive strength between the nanoporous layer and the protective layer In some embodiments, the polymeric protective layer 40 is formed from multi-functional monomers such as trimethanol propane triacrylate (SR 351) or dipentaerythrotol tetraacrylates (SR 499, available from Sartomer of Exton, Pa.).

In some embodiments, the polymeric protective layer 40 is formed from an aqueous emulsion. Such as, for example, ethylene vinyl acetate dispersion available under the designated trade name Vinapass™ 192, Vinapass™ 400, Vinapass™ 420 (Wacker Chemie, Burghausen, Germany), urethane acrylate dispersions such NeoCryl XK-98, A614 and Neo Pac R 9699, NeoRes (available from DSM, Newark, Del.) or acrylate dispersions available under the trade name Rhoplex, such as Rhoplex HA-12 and Rhoplex TR 407 (Rohm Haas, Philadelphia, Pa.). Rhoplex HA-12 is a self-crosslinking, non-ionically stabilized aqueous acrylic emulsion. In some embodiments, the polymeric protective layer 40 is formed from thermoplastic polymers having a $T_g$ of 60 degrees centigrade or greater.

In some embodiments, the polymeric protective layer 40 is a pressure sensitive adhesive. Such as those available as laminating PSA from 3M Company under the tradename OCA 8171 or 8172 (3M Company, St. Paul, Minn.). In many of these embodiments, this pressure sensitive adhesive layer does not include a tackifier or is free of a tackifier that tends to be a low molecular weight material.

In some embodiments, the polymeric protective layer 40 is organo-modified silicones which will not only maintain a low refractive index but also can act as oil, water and finger print resistant coatings. In addition these organo-modified silicones will provide elastomeric characteristic to the protective coating to mitigate cracking on drying or handling a coated low refractive index film. An organo-modified silicone comprises of (meth)acrylate modified silicone, silicone modified (meth)acrylate, silicone-polyurea, silicone-polyurethane-polyurea and silicone polyamides or silicone polyoxamides. These materials can be applied from a water or water/2-propanol dispersion. Examples of these materials can be found in U.S. Pat. Nos. 5,032,460; 5,202,190; 5,154,962 assigned to 3M Company.

In some embodiments, the polymeric protective layer 40 includes a plurality of haze generating particles dispersed in the polymeric protective layer 40. The haze generating particles can be any useful particle such as polystyrene particles, for example. The haze generating particles can have any useful diameter such as 0.5 to 5 micrometers or have an average lateral dimension of 1 micrometer or greater, for example. Typical haze generating particles such as Soken KSR 3A and SX 350H are available from Soken Chemical and Engineering Co. Ltd. Sayama-Shi, Saitama-Ken, Japan.

EXAMPLES

All protective coatings were prepared as described below. The protective overcoats of this invention were coated on PET substrate S1. The substrate S1 was prepared by coating a low haze, low refractive index coating solution on a PET film. This solution was prepared from a mixture of polyvinyl alcohol (PVA) and fumed silica oxide Cab-O-Sperse™ PG022. The PVA resin, Poval™ PVA 235, is an 88% hydrolyzed polyvinyl alcohol available from Kuraray-USA. In a typical procedure, 5000 g of Cab-O-Sperse™ PG 022 dispersion (20 wt % solids) was added to a 20 L plastic container equipped with an air driven laboratory mixer and a heating mantle. The silica dispersion was gently agitated and warmed to 45-50 degrees C. When the dispersion had equilibrated in this temperature range, 90 g of a pre-warmed 5 wt % aqueous boric acid solution (available from Sigma-Aldrich of Milwaukee, Wis., corresponding to 35 g boric acid or 0.035 g boric acid/g silica) was added to the silica dispersion and was mixed for about 30 min After this time, 100 g of a low foaming surfactant (10 wt % Tergitol™ Min-Foam 1× in water, available from Dow Chemical Midland, Mich.) was added to the silica-boric acid mixture followed by the addition of 168 g of polyvinyl alcohol. The PVA was added as 2315 g of an aqueous 7.2 wt % solution. Upon addition of the PVA, the mixture became very viscous and an additional 4350 g of DI water added to reduce the viscosity and ensure adequate mixing. The mixture was agitated under mild conditions for an additional 20 minutes. After this time, the coating solution was transferred to a 30 L, pressure pot container equipped with an air driven agitator and a vacuum system to and degassed at approximately 600-700 mm Hg for 30-45 min. After the mixture was degassed, the solids were checked and the mixture was found to contain 10.2% solids. The final mixture comprised 1 part PVA resin to 6 parts silica on a dry weight basis (1:6 PVA-Si ratio, 14.3% PVA by weight).

Coating Process:

The low index coating solution described above was coated on 50 micron (2 mil) Dupont-Teijin 689 primed PET film using an automated knife over roll coating process to produce the low refractive index coated PET substrate S1. The knife was 41.9 cm (16.5 in) wide and the coating solution was supplied to the coating reservoir via a peristaltic pump. The coating solution was degassed and passed through a 20 micron nominal filter with a hydrophilic filtration media available from Meisner Filtration Products of Camarillo, Calif. The coating solution was delivered warm to the solution bank while the knife and back-up roll were also heated to 38-42° C. (100.4 to 107.6° F.) to prevent solution gelling. The knife coating gap ranged from 101.2 microns (4 mils). The line speed was 4.57m/min (15 fpm). Films were dried in a two zone convection oven with the first zone set at 46.1° C. (115° F.) and the second at 79.4° C. (175° F.). The dried coating was approximately 7-8 microns thick, as determined by a digital micrometer. The refractive index was measured to be 1.164 and the film had transmission-haze-clarity (T-H-C) values of 92%, 4% and 100% respectively.

Process for Making Protective Overcoats:

The protective layers were coated onto S1 using the small laboratory scale hand spread coatings method described below. The substrate S1 was held flat by use of a level 14×11 in. (35.6×27.9 cm) vacuum table model 4900 available from Elcometer Inc. of Rochester Hills, Mich. The coating solution was spread evenly on PET using a wire round coating rods (Meyer rods) available from RD Specialties of Webster NY or by use of a knife bar available from Elcometer Inc (Rochester Hills, Mich.). In a typical procedure, a standard sheet of white paper (8.5×11 in) was placed between the vacuum table and optical film to prevent coating defects associated with the vacuum table. All coatings were made using a degassed solution to avoid optical defects such as air bubble and surface cracks. A 5-8 ml sample of the coating solution was placed near the top of the film and the coating was made using either a number 45 or 30 Meyer Rod which provided a coating with a nominal wet thickness of 114-76.2 microns (4.5 or 3.0 mils) respectively. When a knife bar coater was used, a 50.8-101.6 micron (2 to 4 mil) knife bar gap provided a coating with a nominal wet thickness of 25.4 and 50.8 microns (1 to 2 mils) respectively. The wet coatings were allowed to air dry at room temp for about 2-3 minutes and were then carefully transferred to a flat glass plate and placed in a forced air oven at 50° C. to dry completely. The coatings were covered with an appropriately sized aluminum pan to reduce drying patterns on the film due to air movement in the oven.

Refractive Index Measurements:

Refractive index (RI) values were determined by use of the prism coupling method using the Metricon 2010M Prism Coupler available from Metricon Corp. of Pennington, N.J. The RI (n) was determined at 633 nm. Accurate determination of the refractive index of the higher haze coatings was best determined by measuring the refractive index in the TM polarization state through the PET side of the coated film. In this process, the prism and the PET side of the coatings were coupled and the RI measurement was scanned between n=1.55 to 1.05. This method results in the detection of two critical angle transitions; one associated with the PET-prism interface at n=~1.495 and another associated with the PET-low index coating interface. The Metricon raw data were analyzed to determine the critical angle of this second transition by use of a 200 point smoothing analysis program of the regions above and below the inflection point of this second critical angle. Two linear regions were determined from the smoothed data and the intersection of these two lines corresponded to the inflection point of the curve and thus the RI of low refractive index coating.

Water Hold Out Test:

In these tests, a small (approximately 10 cm$^2$ (4 in$^2$)) section of the coated film was placed on a flat surface and about 0.5 to 1 ml of deionized (DI) water was placed on the protective coated surface. The behavior of the water droplet provided a qualitative evaluation of the integrity of the protective over coat. If the protective layer provided a barrier to water the water droplet would bead up or wet the surface but not penetrate the porous low refractive index layer. If the porous low refractive index layer was not protected or the over coated surface was hydrophilic the water would penetrate the surface. A "fail" rating denotes that within one minute, water was absorbed into the surface. A "pass" rating denotes the water did not penetrate the surface after 1 minute. A "pass +" rating denotes the water did not penetrate the surface even after 5 minutes.

Heat Age Testing:

The thermal stability of the protective overcoats was evaluated by a heat age test. In these tests, a small (approximately 10 cm$^2$ (4 in$^2$)) section of the coated film was placed on an aluminum pan in a standard laboratory oven at the temperature and times as indicated in the tables. The refractive index values of the films were determined as described previously and are reported in the experimental tables.

Coated Article Optics:

Transmission, haze and clarity values were determined using a BYK-Gardner Haze Gard Plus (available from BYK-Gardner USA of Columbia, Md.). The reported values represent the average of at least 3 measurements taken from different regions of the coated film. The clarity value calculation uses the ratio $(T_2-T_1)/(T_1+T_2)$, where $T_1$ is the transmitted light that deviates from the normal direction between 1.6 and 2 degrees, and T2 is the transmitted light that lies between zero and 0.7 degrees from the normal direction.

Coated Article Optics:

Transmission, haze and clarity values were determined using a BYK-Gardner Haze Gard Plus (available from BYK-Gardner USA of Columbia, Md.). The reported values represent the average of at least 3 measurements taken from different regions of the coated film. The clarity value calculation uses the ratio $(T_2-T_1)/(T_1+T_2)$, where $T_1$ is the transmitted light that deviates from the normal direction between 1.6 and 2 degrees, and $T_2$ is the transmitted light that lies between zero and 0.7 degrees from the normal direction.

Materials Used to Make Protective Overcoat Solutions:

(CE-1 and EX-1) Ethylene vinyl acetate (Vinnapas™ 400 and Vinnapas™ 192) were obtained from Wacker Chemie of GmbH, Burghausen, Germany. Vinnapas™ 400 is described as a non-crosslinking grade of EVA and Vinnapas™ 192 is described as a self crosslinking grade of EVA. Both materials are provided as 51% solids dispersions in water.

Preparation of Coating Solution CE-1:

100 g of Vinnapas™ 400 was weighed into an 800 ml plastic beaker. 200 g of DI water and 0.5 g of a 10% solution of Tergitol™ Min-Foam 1× (Available from Dow Chemical Midland, Mich.) was added to the EVA dispersions. The components were mixed thoroughly at low shear using an air driven laboratory mixer for about 5 minutes. The mixture was transferred to a 500 ml, 1-neck round bottom flask and placed on a rotary evaporator system (available as a Rotovaptm from Buchi GmbH Flawil Switzerland) at 40° C. and 600 mm Hg vacuum to degassed the mixture. The coating solution was found to contain approximately 17% solids and was used to make the protective overcoat layer CE-1. The solution CE-1 was coated using a knife bar with a 50.8 micron (2 mil) gap.

Example EX-1:

Was prepared in essentially the same manner as CE-1 but the dispersion used was Vinnapas™ 192.

Preparation of Coating Solution CE-2:

Was prepared in essentially the same manner as CE-1 but 33 g of Soken KSR 3A crosslinked polystyrene beads were added to the mixture. (KSR 3A was obtained from Soken Chemical and Engineering Co. Ltd. Sayama-Shi, Saitama-Ken Japan.) The addition of the beads increased the solids and the viscosity of the mixture. Therefore, an additional 150 g of DI water was added to the mixture. This mixture was agitated further until the beads were well dispersed. The final mixture was degassed as described for CE-1 and was approximately 18% solids. CE-2 contained on a dry solids basis 40% wt KSR3A beads and 60 wt % Vinnapas™ 400.

Example EX-2:

Was prepared in essentially the same manner as CE-2 but the dispersion used was Vinnapas™ 192.

Coatings Solutions CE-1 and 2 and EX 1 and 2 were over coated on Substrate S1 as described above with a knife bar gap of 101.2 microns (4 mil) to produce an approximate wet coating thickness of 50.8 microns (2 mil). The impact of heat aging on Refractive Index is shown in Table #1.

TABLE #1

Impact of heat aging on the RI of ULI layers with Protective Over Coats

| | | 90° C. Heat aging Refractive Index After Heat Aging | | |
|---|---|---|---|---|
| Sample | Over Coat Type | 0 Hrs | 37 hrs | 185 hrs |
| CE-1 | EVA 400 only | 1.182 | 1.243 | 1.222 |
| EX-1 | EVA 192 Only | 1.168 | 1.191 | 1.189 |
| CE-2 | EVA-400 + KSR 3A Beads | 1.167 | 1.217 | 1.239 |
| EX-2 | EVA-192 + KSR 3A Beads | 1.168 | 1.17 | 1.174 |

The data in Table 1 show that the refractive index change after heating for the protective layer derived from for the self-crosslinking EVA 192 is less than the refractive index change for the non-crosslinking EVA 400.

Coating solutions CE-3 and EX-3-5 were prepared from Polymethylmethacrylate resins obtained from Sigma Aldrich Chemicals of Milwaukee, Wish. The PMMA coating solutions were prepared at 10% solids by dissolving the PMMA in 2-butanone at room temperature. The mixtures were agitated slowly on a standard laboratory oscillating mixer for 16 hours to ensure complete dissolution of the polymers. Once the polymers were completely dissolved the coating solutions they were allowed to sit at room temperature for at least one hour to allow any dissolved air to dissipate from the solutions. Sample CE-3 was prepared using 15,000 g/mol PMMA; EX 3 was prepared from 100,000 g/mol PMMA; EX-4 was prepared from 320,000 g/mol PMMA, EX-5 was prepared from 990,000 g/mol PMMA. The impact on the RI of the coating layers is shown in Table #2.

TABLE #2

Impact of polymer molecular weight used for protective overcoats on the RI of the low index layer
PMMA over coats on Low RI Layer S1: Impact of Molecular weight on RI

| | No PMMA | 15K g/mol | 100K g/mol | 320K g/mol | 990K g/mol |
|---|---|---|---|---|---|
| Sample | S1 | CE-3 | EX-3 | EX-4 | EX-5 |
| Initial RI on S1 | 1.168 | 1.315 | 1.212 | 1.222 | 1.224 |
| Water Hold drop test | Fail | Pass | Pass | Pass | Pass |

The data in Table 2 shows the lower molecular weight PMMA is able to penetrate the pores compared to the higher molecular weight protective over coats.

In a manner similar to the preparation used for CE-2, the coating solutions used for EX-3 (100,000 g/mol PMMA) and EX-5 (990,000 g/mol PMMA) were modified by the addition of 40 wt % Soken KSR 3A polystyrene diffuser beads to make a protective diffuser solutions EX-6 and EX-7 respectively. In these examples the solvent used was MEK and instead of water as was used for CE-2. These compositions form a protective diffuser layer that modifies the optical properties but also provides protection of the low refractive index porous layer. The optical data of these diffuse protective overcoats are summarized in Table #3.

TABLE #3

PMMA Diffuser over coats on Low RI Layer S1: Impact of heat aging on RI

| Sample | Description | RI-initial | RI After 185 hrs at 90 C. | T-H-C |
|---|---|---|---|---|
| S1 | No over coat | 1.164 | 1.164 | 92-4-100 |
| Ex-6 | PMMA-100k g/mol + 40% KSR 3A | 1.214 | 1.22 | 78-98-12 |
| EX-7 | PMMA-990k g/mol + 40% KSR 3A | 1.20 | 1.190 | 88-97-6 |

Another category of materials that can be advantageously used as protective overcoats are organo-modified silicones. The organo-modified silicone comprises of (meth)acrylate modified silicone, silicone modified (meth)acrylate, silicone-polyurea, silicone-polyurethane-polyurea and silicone polyamides or silicone polyoxamides. The following (meth) acrylate modified silicone samples were use to prepare prepared protective overcoats useful in this invention.

EX-8 Preparation of Silicone Acrylate Protective Overcoat Solution:

An amber-colored quart bottle was charged with 50 g methyl acrylate (MA), 20 g methyl methacrylate (MMA), 5 g methacrylic acid (MAA), 25 g mercapto functional silicone (KF-2001), available from Shin-Etsu, 0.25 g azobisisobutyronitrile (AIBN) initiator and 150 g methyl ethyl ketone (MEK) solvent. The sealed bottle containing the solution was tumbled in a constant temperature bath at 55° C. for 48 hr. The resulting polymer solution at 39.5% solids was inverted to water by adding 570 g of DI H2O and 3.7 g ammonium hydroxide. The mixture was put on a table top shaker for about 30 minutes to obtain a homogenous dispersion. The resulting dispersion was subjected to a vacuum strip at about 45° C. to strip-off MEK. The final slightly milky looking dispersion was obtained at about 15% solids in H2O.

Coating solution EX-8 was prepared from this polymer solution by diluting 35 g of the solution (containing 5.25 g solids polymer) to 100 g using 65 g of solvent blend. The blend comprised 77 wt % 2-propanol (IPA) and 13 wt % DI water. This produced the final coating solution EX-8 at 5% solids in a 50/50 IPA-Water solvent blend. The substrate S1 was coated with EX8 solution using a knife bar with a 101.6 micron (4 mil) bar gap and dried as described previously.

EX-9 Preparation of Silicone Acrylate Protective Overcoat Solution:

This polymer solution was prepared in a manner similar to EX-8 except the composition of this polymer had an increased amount of MMA at the expense of the MA to increase the Tg of the polymer. An amber-colored quart bottle was charged with 18.2 g methyl acrylate (MA), 45.4 g methyl methacrylate (MMA), 9.1 g methacrylic acid (MAA), 27.3 g mercapto functional silicone (KF-2001), available from Shin-Etsu, 0.25 g azobisisobutyronitrile (AIBN) initiator and 150 g methyl ethyl ketone (MEK) solvent. The sealed bottle containing the solution was tumbled in a constant temperature bath at 55 C for 48 hr. The resulting polymer solution at 39.2% solids was inverted to water by adding 900 g of DI H2O and 6.5 g ammonium hydroxide. The mixture was put on a table top shaker for about 30 minutes to obtain a homogenous dispersion. The resulting dispersion was subjected to a vacuum strip at about 45° C. to strip-off MEK. The final slightly milky looking dispersion was obtained at about 10% solids in H2O. Coating solution EX-9 was prepared from this polymer solution by diluting 50 g of the solution (containing 5 g solids polymer) to 100 g using 50 g of a solvent blend. The blend comprised 77 wt % 2-propanol (IPA) and 13 wt % DI water. This produced the final coating solution EX-9 at 5% solids in a 38/62 IPA-Water solvent blend. The substrate S1 was coated with EX-9 solution using a knife bar with a 101.6 micron (4 mil) bar gap and dried as described previously.

TABLE #4

Silicone acrylate over coats on Low RI Layer S1: Impact of heat aging on RI water hold out test.

| | | 90° C. Heat aging Refractive Index After Heat Aging | | |
|---|---|---|---|---|
| Sample | Over Coat Type | 0 Hrs | 24 hrs | Water hold out |
| EX-8 | Silicone Acrylate 20 wt % MMA | 1.164 | 1.185 | Pass+ |
| Ex-9 | Silicone Acrylate 45 wt % MMA | 1.161 | 1.168 | Pass+ |

The data in Table #4 is shows the silicone acrylate can form protective over coats that do not penetrate the pore and increase the refractive index and that the overcoats have improved water resistance as measured by the water hold out test.

Ex 10-12:

Protective over coats prepared from urethane and urethane acrylate dispersions were from pared from NeoCryl XR-98 (EX-10), NeoCryl 614 (EX-11), NeoPac R-9699 (EX-12). The resins are available as ~37% aqueous dispersions from DMS-NeoRes of Wilmington, Mass. The mixtures were diluted to 22% wt solids with water. The solutions were coated on S1 using a #12 wire-wound rod (obtained from RD Specialties, Webster, N.Y.) to form approximately a 1.2 mil wet layer of the coating solution. The coatings were then dried in an oven at 65° C. for 2 minutes, The refractive indices of the films were measured as summarized below in Table #5. RI refers to refractive index, and T-H-C refers to transmission, haze and clarity respectively.

TABLE 5

Performance evaluation of the resulting protected low index elements

| Sample | Description | RI-initial | RI After 24rs at 85° C. | Water hold out |
|---|---|---|---|---|
| S1 | No over coat | 1.164 | 1.161 | Fail |
| EX-10 | NeoCryl XK-98 | 1.170 | 1.171 | Pass+ |
| EX-11 | NeoCryl A-614 | 1.164 | 1.167 | Pass+ |
| EX-12 | Neo Pac R 9699 | 1.161 | 1.161 | Pass+ |

The data in Table #5 show the self crosslinking urethane acrylate can form protective over coats that do not penetrate the pore and increase the refractive index and that the overcoats have improved water resistance as measured by the water hold out test Thus, embodiments of the PROTECTED LOW REFRACTIVE INDEX OPTICAL ELEMENT are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. An optical article comprising:
    a first optical element comprising a polarizing film, a diffusing film, a reflecting film, a retarder, a light guide or a liquid crystal display panel; and
    a second optical element comprising:
    (a) a low refractive index layer having an effective refractive index of 1.3 or less disposed on the first optical element, the low refractive index layer comprising: a binder; a plurality of particles of fumed silica or fumed alumina dispersed in the binder; wherein the low refractive index layer comprises a plurality of interconnected voids and has a thickness of 1 to 20 micrometers; and
    (b) a water resistant polymeric protective layer formed from polymers having an average molecular weight of greater than 50,000 g/mol disposed on the low refractive index layer, wherein the polymeric protective layer has a thickness of 1 to 15 micrometers, said polymers comprising:
        organomodified silicones selected from the group consisting of (meth)acrylate modified silicones, silicone modified (meth)acrylates, silicone-polyureas, silicone-polyurethane-polyureas, silicone polyamides, and silicone polyoxamides; or thermoplastic silicone acrylate copolymers; and
    wherein the polymeric protective layer does not increase an effective refractive index of the second optical element by greater than 10% as compared to a second optical element having no polymeric protective layer.

2. An optical article according to claim 1, wherein the polymeric protective layer is formed from polymers having an average molecular weight of at least 100,000 g/mol.

3. An optical article according to claim 1, wherein the polymeric protective layer comprises cross-linked polymers.

4. An optical article according to claim 3, wherein the polymeric protective layer is formed from an aqueous emulsion.

5. An optical article according to claim 1, wherein the polymeric protective layer comprises thermoplastic polymers having a $T_g$ of 60 degrees centigrade or greater.

6. An optical article according to claim 1, wherein the polymeric protective layer is a pressure sensitive adhesive.

7. An optical article according to claim 1, wherein the polymeric protective layer comprises a plurality of haze generating particles dispersed in the protective layer.

8. An optical article according to claim 7, wherein the haze generating particles have an average lateral dimension of 1 micrometer or greater.

9. An optical article according to claim 1, wherein the plurality of particles comprises fumed silica.

10. An optical article according to claim 1, wherein a weight ratio of the binder to the plurality of particles is 1:2 or less.

11. An optical article according to claim 1, wherein the optical article has a haze value of at least 75%.

12. An optical article according to claim 1, further comprising a second low refractive index layer disposed on the optical element or polymeric protective layer or between the low refractive index layer and the polymeric protective layer.

13. An optical article comprising:
    an optical element;
    a low refractive index layer having an effective refractive index of 1.3 or less disposed on the optical element, the low refractive index layer comprising: a binder; a plurality of fumed silica particles dispersed in the binder; and wherein the low refractive index layer comprises a plurality of interconnected voids and has a thickness of 1 to 20 micrometers; and a polymeric protective layer formed from polymers having an average molecular weight of greater than 50,000 g/mol said polymers comprising crosslinked organo-modified silicone selected from the group consisting of (meth)acrylate modified silicones, silicone modified (meth)acrylates, silicone-polyureas, silicone-polyurethane-polyureas, silicone polyamides, and silicone polyoxamides; wherein the polymeric protective layer has a thickness of 1 to 15 micrometers.

14. An optical article according to claim 13, wherein the polymeric protective layer comprises polymers having an average molecular weight of at least 100,000 g/mol.

15. An optical article according to claim 13, wherein the polymeric protective layer comprises polymers having an average molecular weight of at least 250,000 g/mol.

16. An optical article according to claim 13, wherein the polymeric protective layer comprises polymers having an average molecular weight of at least 500,000 g/mol.

17. An optical article according to claim 13, wherein a weight ratio of the binder to the plurality of particles is 1:2 or less.

18. An optical article according to claim 13, wherein the optical article has a haze value of at least 75%.

* * * * *

UNITED STATES PATENT AND TRADEMARK OFFICE
CERTIFICATE OF CORRECTION

Page 1 of 2

PATENT NO. : 10,502,869 B2
APPLICATION NO. : 13/879842
DATED : December 10, 2019
INVENTOR(S) : William Coggio et al.

It is certified that error appears in the above-identified patent and that said Letters Patent is hereby corrected as shown below:

On the Title Page

Column 2 (Other Publication),
Line 2, delete "Publising." and insert -- Publishing. --, therefor.

In the Specification

Column 4,
Line 62, delete "polyvinylalcohol, (PVA)," and insert -- polyvinylalcohol (PVA), --, therefor.
Line 64, delete "vinly" and insert -- vinyl --, therefor.

Column 5,
Line 5, delete "Rhom" and insert -- Rohm --, therefor.
Line 13, delete "triacryalate." and insert -- triacrylate. --, therefor.
Line 32, delete "titantates" and insert -- titanates --, therefor.
Line 33-34, delete "poly(epichlorhydrin)amide" and insert -- poly(epichlorohydrin)amide --, therefor.
Line 52, delete "Cabo-Sil™" and insert -- Cab-O-Sil™ --, therefor.
Line 55-56, delete "Cabo-Sperse™" and insert -- Cab-O-Sperse™ --, therefor.
Line 62, delete "Cabo-Sperse," and insert -- Cab-O-Sperse, --, therefor.
Line 63, delete "Cabo-Sperse™" and insert -- Cab-O-Sperse™ --, therefor.

Column 6,
Line 33, delete "isocynanate," and insert -- isocyanate, --, therefor.
Line 35, delete "alkloxy," and insert -- alkoxy, --, therefor.
Line 41, delete "Cabo-Sil™" and insert -- Cab-O-Sil™ --, therefor.
Line 53, delete "3- (" and insert -- 3-( --, therefor.

Column 7,
Line 10 (approx.), delete "Intersceince," and insert -- Interscience, --, therefor.
Line 57, delete "Braunauer," and insert -- Brunauer, --, therefor.

Signed and Sealed this
Eighteenth Day of August, 2020

Andrei Iancu
*Director of the United States Patent and Trademark Office*

CERTIFICATE OF CORRECTION (continued)
U.S. Pat. No. 10,502,869 B2

Column 9,
Line 65, delete "Grauvre" and insert -- Gravure --, therefor.

Column 11,
Line 9, after "layer" insert -- . --.
Line 17-18, delete "Vinapass™ 192, Vinapass™ 400, Vinapass™ 420" and insert -- Vinnapas™ 192, Vinnapas™ 400, Vinnapas™ 420 --, therefor.

Column 14,
Line 36, delete "Rotovaptm" and insert -- Rotovap™ --, therefor.

Column 17,
Line 49 (approx.), delete "24rs" and insert -- 24 hrs --, therefor.
Line 60, after "test" insert -- . --.